United States Patent [19]

Shino et al.

[11] Patent Number: 5,130,521
[45] Date of Patent: Jul. 14, 1992

[54] OPTICAL CARD RECORDING APPARATUS

[75] Inventors: Kuninori Shino, Shibuya; Hiroshi Ohki, Kawasaki, both of Japan

[73] Assignee: Sony Corporation, Tokyo, Japan

[21] Appl. No.: 208,418

[22] PCT Filed: Oct. 2, 1987

[86] PCT No.: PCT/JP87/00731
§ 371 Date: Jun. 2, 1988
§ 102(e) Date: Jun. 2, 1988

[87] PCT Pub. No.: WO88/02541
PCT Pub. Date: Apr. 7, 1988

[30] Foreign Application Priority Data

Oct. 3, 1986 [JP] Japan .................. 61-236500

[51] Int. Cl.$^5$ ............... G06K 7/10; G06K 13/063; G11B 23/00
[52] U.S. Cl. .................... 235/476; 235/454; 235/479; 235/487; 360/2; 369/258
[58] Field of Search ............... 369/258; 235/454, 456, 235/485, 486, 460, 487, 476, 479; 360/2

[56] References Cited

U.S. PATENT DOCUMENTS

| | | | |
|---|---|---|---|
| 3,885,132 | 5/1975 | Luoma | 235/479 X |
| 4,121,249 | 10/1978 | Lemelson . | |
| 4,141,044 | 2/1979 | Kistner et al. . | |
| 4,152,584 | 5/1979 | Sato | 235/486 X |
| 4,179,621 | 12/1979 | Crean et al. | 235/454 |
| 4,213,040 | 7/1980 | Gokey et al. | 235/454 |
| 4,260,162 | 4/1981 | Morii et al. | 369/33 |
| 4,398,223 | 8/1983 | Lemelson . | |
| 4,500,777 | 2/1985 | Drexler . | |
| 4,544,835 | 10/1985 | Drexler . | |
| 4,575,703 | 3/1986 | Shishido | 235/479 |
| 4,592,042 | 5/1986 | Lemelson et al. | 369/258 |
| 4,598,196 | 7/1986 | Pierce et al. . | |
| 4,724,310 | 2/1988 | Shimamura et al. | 235/486 |
| 4,791,282 | 12/1988 | Schmidt et al. | 235/485 |
| 4,800,258 | 1/1989 | Suzuki et al. | 235/479 |
| 4,870,635 | 9/1989 | Block et al. | 369/215 |
| 4,931,628 | 6/1990 | Wada | 235/456 X |
| 4,933,537 | 6/1990 | Takahashi et al. | 235/479 X |

FOREIGN PATENT DOCUMENTS

| | | |
|---|---|---|
| 53-42804 | 4/1978 | Japan . |
| 61-214239 | 9/1986 | Japan . |
| WO82/02969 | 2/1982 | World Int. Prop. O. . |

Primary Examiner—Stuart S. Levy
Assistant Examiner—Joe Rhoa
Attorney, Agent, or Firm—Philip M. Shaw, Jr., Ltd.

[57] ABSTRACT

An optical card recording apparatus comprises a card holding member (17) on which an optical card is loaded at a predetermined position, a driving device (12,14,15,16, 17G,22,24,25) for moving the card holding member (17) in relation to a fixed member, and a movement control device (45, 51) operative to control the driving device (12,14,15,16, 17G,22,24,25) so as to place the card holding member (17) at a reference position in relation to the fixed member and then to move the card holding member (17) from the reference position or a position at which the card holding member (17) reaches after moving from the reference position by a selected distance in a predetermined manner, so that record tracks are formed on the optical card in a predetermined arrangement by a light beam caused to be incident upon the optical card loaded on the card holding member (17). With the arrangement thus constituted, information can be properly written in selected portions of an optical card on which neither tracking guides nor address data have been provided or recorded in advance.

12 Claims, 5 Drawing Sheets

OPTICAL CARD RECORDING APPARATUS

TECHNICAL FIELD

The present invention relates to an optical card recording apparatus for causing a light beam, such as a laser light beam, to impinge upon a predetermined portion of an optical card loaded on the apparatus so as to write information on the optical card, and further as occasion demands, to read information from the optical card.

TECHNICAL BACKGROUND

There has been proposed an optical card system in which an optical card available for optically writing information therein by means of, for example, a laser light beam is used for recording information and information written on the optical card is reproduced from the optical card by, for example, a laser light beam.

In the optical card system proposed previously and disclosed in, for example, Japanese patent application published before examination under publication No. 60-229244, the optical card on which tracking guides are formed in a predetermined pattern is loaded on an optical card recording and reproducing apparatus. In the optical card recording and reproducing apparatus, the tracking guides provided on the optical card are detected and a position on the optical card upon which a light beam impinges is controlled in accordance with the tracking guides so that a tracking servo control of the light beam is carried out. Then, with the light beam subjected to the tracking servo control, writing of information on the optical card and reading of information from the optical card are performed. Further, in the optical card system proposed previously, the optical card is provided with address data recorded thereon beforehand, and the optical card recording and reproducing apparatus is operative to detect a position on the optical card in which information is to be written based on the address data read from the optical card and to write the information in the detected position on the optical card.

In the optical card recording and reproducing apparatus used in the optical card system previously proposed as mentioned above, an error signal for the tracking servo control of the light beam is produced based on the tracking guides provided beforehand on the optical card and detected from the optical card. Further the address data recorded beforehand on the optical card are read from the optical card to form reproduced address data when information is written in the optical card. Generally, the tracking guides are formed on the optical disc with, for example, a number of minute dots, each of which has a width of about $10\mu$. The address data are recorded on the optical disc by aligning a number of minute dots each having a width of about $10\mu$. The results is that the optical card recording and reproducing apparatus is required to read the minute dots for performing the tracking servo control of the light beam and for detecting the position on the optical card on which the information is to be written. Such reading of the minute dots by the optical card recording and reproducing apparatus easily receives a bad influence from scratches, dust or fingerprints on the surface of the optical card. Consequently, it is feared that the detection of the tracking guides and the reading of the address data from the optical card are not conducted accurately. Therefore, the tracking control of the light beam and the detection of the position at which the information is to be written are not carried out properly in the optical card recording and reproducing apparatus, making the optical card hard to handle.

SUMMARY OF THE INVENTION

Accordingly, it is an object of the present invention to provide an optical card recording apparatus which is capable of causing a light beam to impinge upon a desired position on an optical card so as to write information in a record track formed on the optical card in a predetermined manner, without either a tracking servo control of the light beam for detection of tracking guides provided beforehand on the optical card, or detection of the position on the optical card where the information is to be written based prerecorded on address data read from the optical card. The optical card on which neither tracking guides nor address data have been actually provided or recorded in advance may also be used, as occasion demands, for reading information written on the optical card.

To achieve the end described above, the optical card recording apparatus according to the present invention comprises, a card holding member provided with a card supporting portion on which an optical card is loaded at a predetermined position and mounted on a fixed member to be movable in both first and second directions perpendicular to each other, a driving device for moving the card holding member in the first and second directions in relation to the fixed member, a reference position detector for detecting the card holding member positioned at a reference position in relation to the fixed member, an optical device for causing a light beam modulated in response to information and emitted therefrom to impinge upon the optical card loaded at the predetermined position on the card holding member so as to record the information on the optical card, and a movement control device for controlling the movement of the card holding member through the driving device. The movement control device is operative to control the driving device to put the card holding member at the reference position and then, after a detection output of the reference position detector is obtained, to control further the driving device to move the card holding member in the first and second directions in accordance with a predetermined moving manner from the reference position or a position at which the card holding member is placed after moving from the reference position by a selected distance in one of the first and second directions, so as to put the optical card in a condition in which record tracks can be formed on the optical card in a predetermined manner by the light beam emitted from the optical device to be incident upon the optical card loaded at the predetermined position on the card holding member.

One example of the optical card recording apparatus according to the present invention comprises an information reproducing arrangement for causing another light beam to impinge upon the optical card in which information has been written to form the record tracks in order to read the information from the optical card.

In order to write information on the optical card recording apparatus of the present invention, for example, first, the driving device is caused to operate by the movement control device to move the card holding member into the reference position. The detection output of the reference position detector is obtained when the card holding member reaches the reference position. Then, after the detection output of the reference position detector is obtained, if the optical card is not loaded on the card supporting position, the movement control device causes the driving device to move the card holding member into a predetermined card loading and unloading position from the reference position and the optical card is loaded on the card supporting portion of the card holding member placed at the card loading and unloading position.

After that, the movement control device further causes the driving device to move the card holding member accompanied with the optical card into the reference position or the position where it is distant from the reference position by the predetermined distance in the first or second directions so that the card holding member is placed at a selected position to start writing the information on the optical card. Then, under a condition in which the light beam from the optical device is continuously or intermittently incident upon the optical card, loaded on the card supporting portion, the card holding member is moved in the first and second directions in the predetermined manner. Consequently, the information is written in selected portions of the optical card by the light beam emitted from the optical device to impinge upon the optical card to form the record tracks in the predetermined pattern on the optical card.

With the optical card reading apparatus according to the present invention, the information can be properly written in the record tracks formed at selected portions of the optical card without either tracking servo control of the light beam for detecting prerecorded tracking guides, or detection of a position on the optical disc where information is to be written based on prerecorded address data read from the optical card. The result is that, with the optical card recording apparatus according to the present invention, generally, information can be appropriately written in record tracks formed exactly in a predetermined manner on selected portions of an optical card on which neither tracking guides nor address data have been provided or recorded in advance.

BRIEF DESCRIPTION OF THE DRAWINGS

FIGS. 6-(1) and 6-(2) show together a flow chart representing an example of a control program carried out for an information writing operation by a microprocessor employed as a controller in the embodiment shown in FIG. 1.

DETAILED DESCRIPTION OF THE PREFERRED EMBODIMENT

Figure 1:
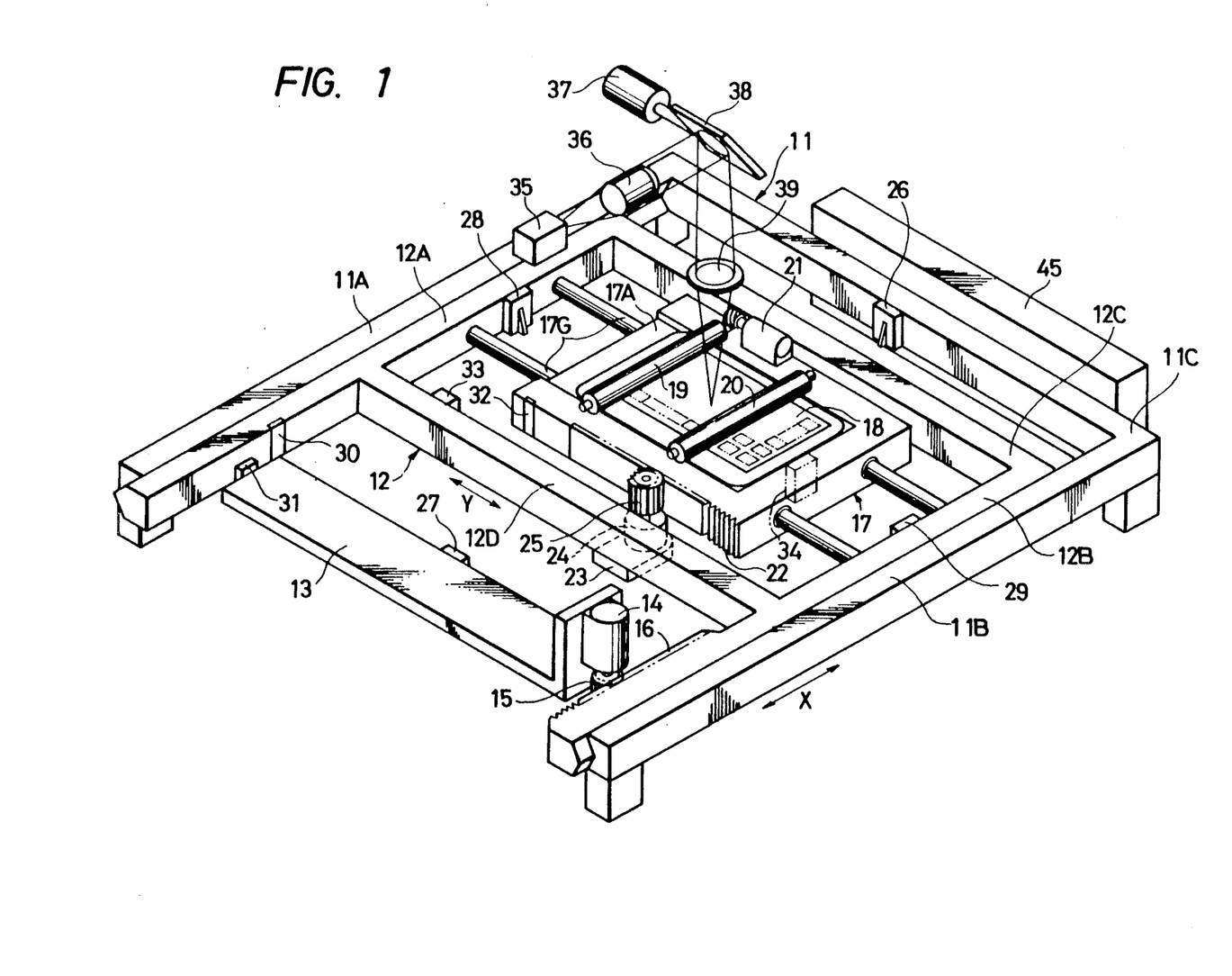
FIG. 1 is a schematic perspective view showing an essential part of one embodiment of the optical card recording apparatus according to the present invention.

FIG. 1 shows an essential part of one embodiment of the optical card recording apparatus according to the present invention.

In the embodiment shown in FIG. 1, a fixed member 11 formed into a frame structure comprises a pair of guide portions 11A and 11B disposed in parallel with each other and a connecting portion 11C interconnecting one end of the guide portion 11A and one end of the guide portion 11B. On the inside of the fixed member 11, a sliding member 12 formed into a frame structure along the fixed member 11 is provided. The sliding member 12 comprises a pair of engaging portions 12A and 12B disposed in parallel with each other, an end connecting portion 12C interconnecting one end of the engaging portion 12A and one end of the engaging portion 12B, and an intermediate connecting portion 12D interconnecting the middle of the engaging portion 12A and the middle of the engaging portion 12B. The outer side of the engaging portion 12A engages the inner side of the guide portion 11A of the fixed member 11. The outer side of the engaging portion 12B engages the inner side of the guide portion 11B of the fixed member 11 so that the engaging portions 12A and 12B are slidable against the guide portions 11A and 11B respectively in an X direction indicated by an arrow X in FIG. 1. Therefore, the sliding member 12 in its entirety is supported by the fixed member 11 to be slidable in the X direction.

A fixed plate member 13 is disposed between the engaging portions 12A and 12B on the outside of the intermediate connecting portion 12D. A motor 14 is mounted on the fixed plate member 13. A gear 15 is attached to a rotating shaft of the motor 14 and is engaged with a rack 16 provided on the other end of the engaging portion 12B. Therefore, the sliding member 12 slides against the fixed member 11 when the motor 14 is actuated.

Further, in a space surrounded by the engaging portions 12A and 12B, end connecting portion 12C and intermediate connecting portion 12D of the sliding member 12, a card holding member 17 is supported by a pair of guiding bars 17G which extend in parallel with each other in a Y direction perpendicular to the X direction, as indicated by the arrow Y in FIG. 1. Card holding member 17 is movable between the engaging portions 12A and 12B in the Y direction under the guidance of guiding bars 17G. The card holding member 17 is provided with a card supporting portion 17A on which an optical card 18 is loaded, so that the optical card 18 is placed at a predetermined loading position on the card holding member 17. A driving roller 19 and an idle roller 20 are mounted on the card holding member 17 in parallel with each other to contact an upper surface of the optical card 18 loaded on the card supporting portion 17A. A motor 21 for rotating the driving roller 19 is also mounted on the card holding member 17. The optical card 18 is moved in the Y direction by the driving roller 19, rotated by the motor 21, to enter the card supporting potion 17A from the side of the engaging portion 12A and to be removed from the card supporting portion 17A toward the side of the engaging portion 12A. The idler roller 20 is rotated by the optical card 18 moving in the Y direction.

A rack 22 is formed on a side of the card holding member 17 to face an inner side surface of the intermediate connecting portion 12D. A gear 25 is attached to a rotating shaft of a motor 24 and is engaged with the rack 22. The motor 24 is mounted on a bracket 23 which is attached to an under surface of the intermediate connecting portion 12D. Therefore, the card holding member 17 is moved against the sliding member 12 in the Y direction when the motor 24 is actuated.

The interconnection portion 11C of the fixed member 11 is provided with a limit switch (LS) 26 which is operative to come into contact with an outer side surface of the end connecting portion 12C for detecting a positional limit for the sliding member 12 on the side of interconnecting portion 11C in the X direction when the sliding member 12 is moved toward the end connecting portion 12C in the X direction. A side of the fixed plate member 13 facing the intermediate connecting portion 12D is provided with a limit switch 27 which is operative to come into contact with an outer side surface of the intermediate connecting portion 12D for detecting a positional limit for the sliding member 12 on the side of the fixed plate member 13 in the X direction when the sliding member 12 is moved toward the fixed plate member 13 in the X direction. Further, an inner side surface of the engaging portion 12A is provided with a limit switch 28 which is operative to come into contact with a side of the card holding member 17 for detecting a positional limit for the card holding member 17 on the side of the engaging portion 12A in the Y direction when the card holding member 17 is moved toward the engaging portion 12A in the Y direction. An inner side surface of the engaging portion 12B is provided with a limit switch 29 which is operative to come into contact with a side of the card holding member 17 for detecting a positional limit for the card holding member 17 on the side of the engaging portion 12B in the Y direction when the card holding member 17 is moved toward the engaging portion 12B in the Y direction.

The inner side surface of the engaging portion 12A is further provided with a mirror 30 at a position outside the intermediate connecting portion 12D. A side of the fixed plate member 13 facing the inner side surface of the engaging portion 12A is provided with a photodetecting switch (PI) 31 which is positioned to face the mirror 30 when the sliding member 12 is moved against the fixed member 11 in the X direction and thereby the card holding member 17 is placed at a reference position in the X direction. The side of the card holding member 17 facing an inner side surface of the intermediate connecting portion 12D is provided with a mirror 32. The inner side surface of the intermediate connecting portion 12D is provided with a photodetecting switch 33 which is positioned so as to face the mirror 32 when the card holding member 17 is moved against the sliding member 12 in the Y direction to be placed at a reference position in the Y direction. The photodetecting switches 31 and 33 are operative to detect respectively the reference positions in the X and Y directions for the card holding member 17 in relation to the fixed member 11.

The card holding member 17 contains a limit switch 34 which is operative to come into contact with an end of the optical card 18, detecting the optical card 18 appropriately loaded on the card holding member 17.

Figure 2:
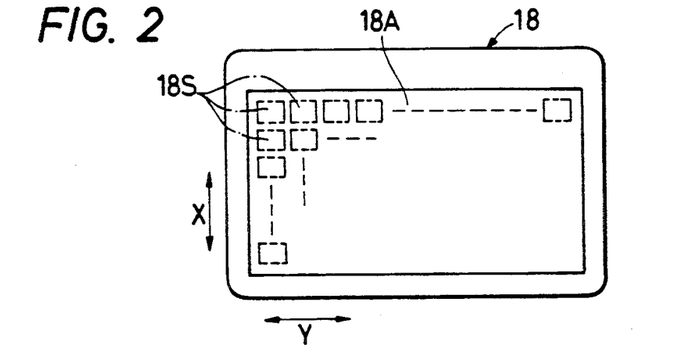
FIG. 2 is a schematic plan view showing an example of an optical card used in the embodiment shown in FIG. 1.

As shown in FIG. 2 for example, the optical card 18 which is to be loaded on the card supporting portion 17A of the card holding member 17 is provided on its recording area 18A with a plurality of sectors 18S arranged to form a plurality of lines each extending in the Y direction and a plurality of rows each extending in the X direction. Each of the sectors is formed with a large number of linear record tracks aggregated.

An optical recording device comprising a laser light source 35, collimator lens 36, a rotary mirror 38 driven by an actuator 37 and an objective lens 39 is disposed above the card holding member 17. The laser light source 35 emits a laser light beam modulated in response to information which is to be written on the optical card 18. The laser light beam emitted from the laser light source 35 is collimated by the collimator lens 36 and reflected at the rotary mirror 38 to be directed to the object lens 39. Then, the laser light beam enters the objective lens 39 and is focused to impinge upon the optical card 18. The rotary mirror 38 is rotated clockwise and counterclockwise in a relatively narrow rotating angle range by the actuator 37 so that the laser light beam focused by the objective lens 39 scans the optical card 18 by a predetermined distance in the X direction repeatedly. Simultaneously the optical card 18 is moved in the X and Y directions together with the card holding member 17. As a result, the information is written on the optical card 18 forming the sectors 18S on the optical card 18.

Figure 3:
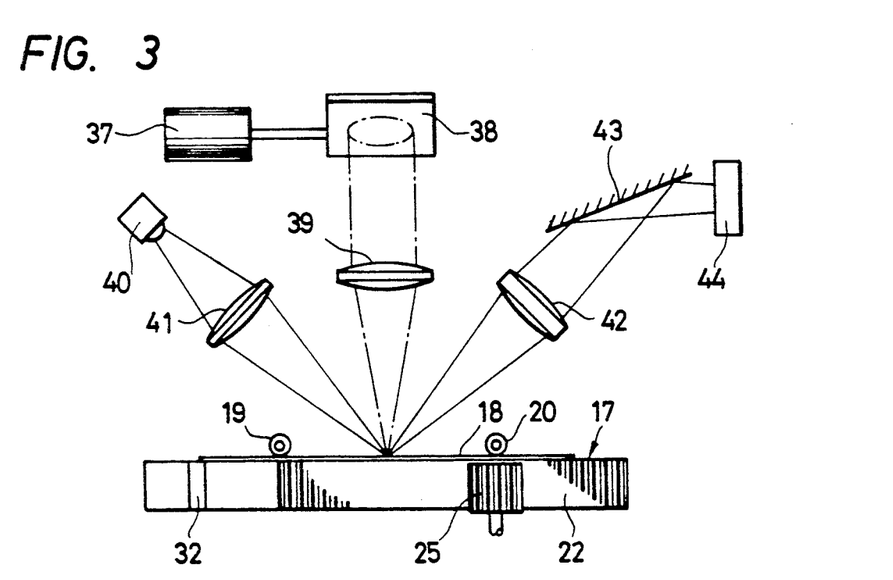
FIG. 3 is a schematic side view showing a part of the embodiment shown in FIG. 1.

Further, in one embodiment the optical reproducing device comprises a light source 40 composed of, for example, a light emitting diode, a converging lens 41, a focusing lens 42, mirror 43 and a line photosensor 44, as shown in FIG. 3, which is disposed also upon the card holding member 17. In this optical reproducing device, under a condition in which a light emitted from the light source 40 is caused by the converging lens 41 to be incident upon the optical card 18 placed on the card holding member 17, an image of each of the record tracks forming each sector 18S on the optical card 18 are projected through the mirror 43 on the line photosensor 44 by the focusing lens 42, and the information recorded in each record track is read by the line photosensor 44.

In the embodiment shown in FIG. 1, in addition to the structural components mentioned above, a control circuit section 45 for controlling the motors 14, 21 and 24, the laser light source 35, the actuator 37, the light source 40 and the line photosensor 44 is provided on the outside of the connecting portion 11C of the fixed member 11.

Figure 4:
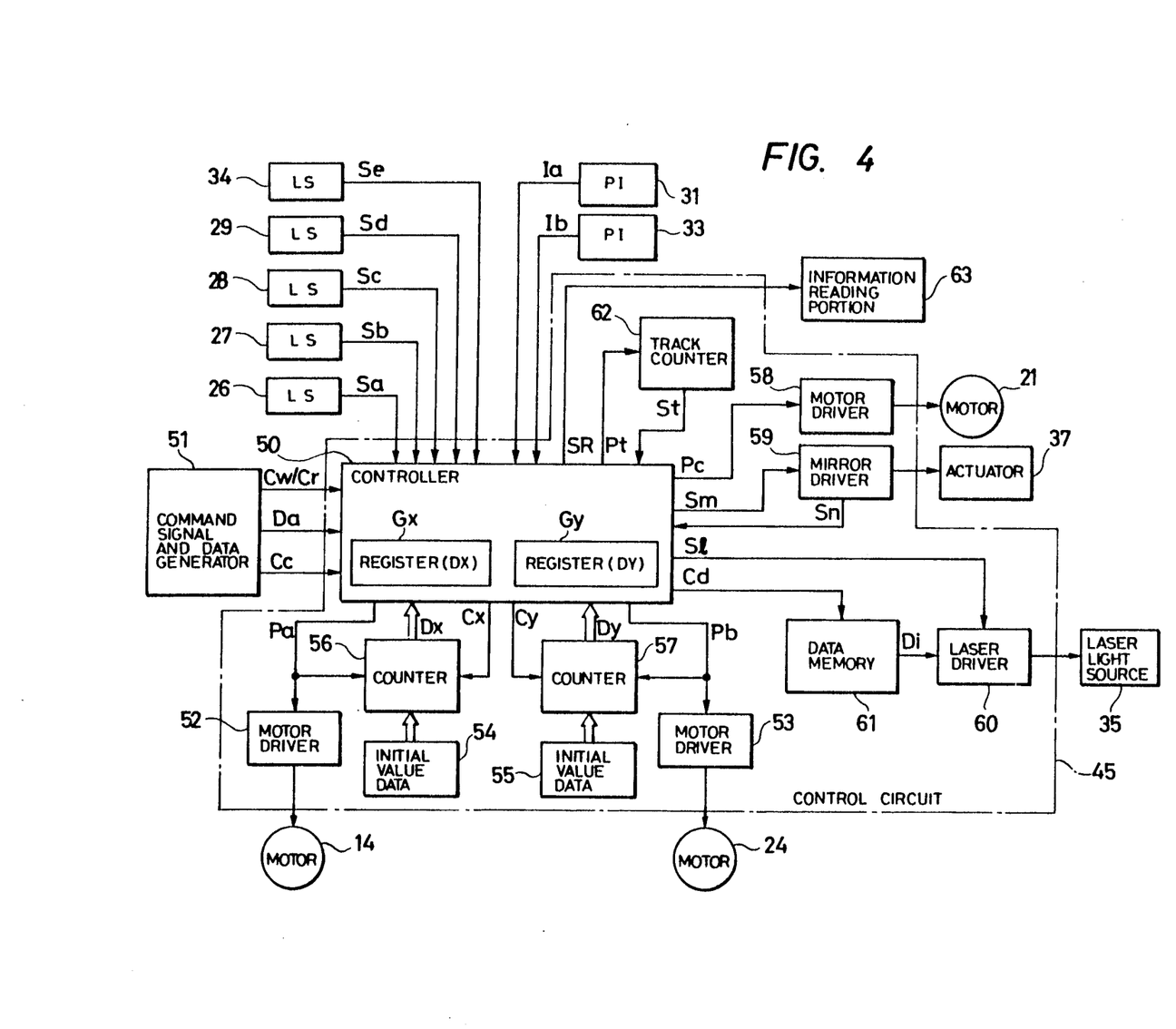
FIG. 4 is a block diagram showing a control circuit section and other circuit portions connected to the control circuit section used in the embodiment shown in FIG. 1.

FIG. 4 shows an example of the control circuit section 45 and other circuit portions connected to the control circuit section 45 in a block diagram.

The example of the control circuit section 45 shown in FIG. 4 contains a controller 50 comprising a microprocessor. The controller 50 is supplied with detection output signals Sa, Sb, Sc and Sd which are obtained from the limit switches (LS) 26, 27, 28 and 29, respectively, when each positional limit aforementioned is detected by the corresponding limit switch and a detection output signal Se is obtained from the limit switch 34 indicating the optical card 18 is positioned properly on the card supporting portion 17A of the card holding member 17. In addition, detection output signals Ia and Ib, which are obtained from the photodetecting switches (PIs) 31 and 33, respectively, when the reference positions in the X and Y directions for the card holding member 17 are detected respectively by the photodetecting switches 31 and 33, are also supplied to the controller 50. Further, the controller 50 is connected with a command signal and data generator 51 provided on the outside thereof to be supplied with a writing command signal Cw, a reading command signal Cr, position designating data Da, and a card loading and unloading command signal Cc sent out from the command signal and data generator 51.

Then, the controller 50 is operative to supply, motor drivers 52 and 53 for driving the motors 14 and 21 respectively, with pulse train signals Pa and Pb for causing each of the motors 14 and 21 to operate. Pulses forming the pulse train signal Pa are counted by a counter 56 which is controlled by a counter control signal Cx supplied from the controller 50 and on which initial value data supplied from an initial value data generator 54 are loaded. Similarly, pulses forming the pulse train signal Pb are counted by a counter 57 which is controlled by a counter control signal Cy supplied from the controller 50 and on which initial value data supplied from an initial value data generator 55 are loaded. Enumerated data Dx and Dy obtained from the counters 56 and 57 respectively are supplied to the controller 50.

The controller 50 is operative also to supply a motor driver 58 for the motor 21 with a driving signal Pc for actuating the motor 21, a mirror driver 59 for actuator 37 with a driving signal Sm for causing the actuator to operate, and a laser driver 60 for the laser light source 35 with a driving signal Sl for causing the laser light source, 35 to operate. Simultaneously with the supply of the driving signal Sl to the laser driver 60, controller 50 supplies a data memory 61 wherein information expected to be written in the optical card 18 is stored with a data control signal Cd. The data memory 61 delivers data Di for writing, selected in response to the data control signal Cd to the laser driver 60. A detection output signal Sn corresponding to the clockwise and counterclockwise rotations of the rotary mirror 38 is obtained from the mirror driver 59 and supplied to the controller 50.

The controller 50 is operative further to supply a track counter 62 with pulses Pt each of which is obtained whenever each of the record tracks forming each sector 18S on the optical card 18 is formed. The track counter 62 counts the pulses Pt supplied from the controller 50 and supplies the controller with a count detection signal St when the enumerated resultant reaches a predetermined value.

The controller supplies an information reading portion 63, including the optical reproducing device shown in FIG. 3, with a group of control signals SR for controlling operations in the information reading portion 63.

With such arrangements as described above, in the case of an information writing operation, first, the pulse train signals Pa and Pb are supplied from the controller 50 to the motor drivers 52 and 53 respectively in the control circuit section 45 and thereby the motors 14 and 24 are actuated. With the operations of the motors 14 and 24, the sliding member 12 is moved toward the connecting portion 11C of the fixed member 11 and the card holding member 17 is moved toward the engaging portion 12A of the sliding member 12. When the sliding member 12 reaches the positional limit on the side of the connecting portion 11C in the X direction, the detection output signal Sa from the limit switch 26 is supplied to the controller 50. Further when the card holding member 17 reaches the positional limit on the side of the engaging portion 12A in the Y direction, the detection output signal Sc from the limit switch 28 is supplied to the controller 50. After the detection output signals Sa and Sc are supplied to the controller 50, the controller 50 ceases to supply the pulse train signals Pa and Pb. Therefore the motor 14 is stopped so that the sliding member 12 is kept at the positional limit on the side of the connecting portion 11C in the X direction and the motor 24 is also stopped so that the card holding member 17 is kept at the positional limit on the side of the engaging portion 12A in the Y direction.

Next, the pulse train signals Pa and Pb which are of different contents from those mentioned above are again supplied from the controller 50 to the motor drivers 52 and 53 respectively and thereby the motors 14 and 24 are actuated, so that the sliding member 12 is moved toward the fixed plate member 13 and the card holding member 17 is moved toward the engaging portion 12A of the sliding member 12. When the sliding member 12 reaches the reference position in the X direction, the detection output signal Ia from the photodetecting switch 31 is supplied to the controller 50. Further when the card holding member 17 reaches the reference position in the Y direction, the detection output signal Ib from the photodetecting switch 33 is supplied to the controller 50. After the detection output signals Ia and Ib are supplied to the controller 50, the controller 50 ceases to supply the pulse train signals Pa and Pb. Therefore the motor 14 is stopped so that the sliding member 12 is kept at the reference position in the X direction and the motor 24 is also stopped so that the card holding member 17 is kept at the reference position in the Y direction.

Next, the controller 50 sends out the counter control signals Cx and Cy for causing the counters 56 and 57 to have the initial value data obtained from initial value data generators 54 and 55 to be loaded on the counters 56 and 57 respectively.

After that, the controller 50 supplies the motor drivers 52 and 53 with the pulse train signals Pa and Pb respectively in accordance with the card loading and unloading command signal Cc from the command signal and data generator 51. Controller 50 then ceases to send out the pulse train signal Pa after the enumerated data Dx obtained from the counter 56 comes to represent a predetermined value. Similarly, controller 50 ceases to send out the pulse train signal Pb after the enumerated data Dy obtained from the counter 57 comes to represent a predetermined value. Accordingly, the motor 14 is rotated in accordance with a predetermined number of pulses forming the pulse train signal Pa, and the motor 24 is rotated in accordance with a predetermined number of pulses forming the pulse train signal Pb, so that the card holding member 17 is moved along the X direction by a predetermined distance from the reference position and also along the Y direction by a predetermined distance from the reference position. As a result, the card holding member 17 is moved into a card loading and unloading position.

Then, the optical card 18 is loaded on the card supporting portion 17A of the card holding member 17 placed at the card loading and unloading position. In such loading of the optical card 18, the driving signal Pc is supplied from the controller 50 to the motor driver 58 for actuating the motor 21 and thereby the driving roller 19 is rotated to move the optical card 18 to engage the card supporting portion 17A toward the limit switch 34. When the optical card 18, which is driven by the driving roller 19 and guided by the idle roller 20, reaches a proper loading position on the card supporting portion 17A contacting the limit switch 34, the detection output signal Se from the limit switch 34 is supplied to the controller 50. After the detection output signal Se is supplied to the controller 50, the controller 50 ceases to supply the driving signals Pc, and therefore the motor 21 is stopped and the loading of the optical card 18 on the card supporting portion 17A is completed.

If the optical card 18 has already been loaded on the card supporting portion 17A when the card holding member 17 is moved into the reference position in the X or Y direction, the loading of the optical card 18 is not carried out.

After the optical card 18 is loaded properly on the card supporting portion 17A, the controller 50 stores target data DX, corresponding to a position on the optical card 18 in the X direction designated by the position designating data Da from the command signal and data generator 51, and target data DY, corresponding to a position on the optical card 18 in the Y direction designated also by the position designating data Da respectively, in registers Gx and Gy contained therein, in response to the writing command signal Cw from the command signal and data generator 51. Such designations of the positions on the optical card 18 in the X and Y directions are achieved by designating one of the lines and one of the rows of the sectors on the optical card 18.

Next, the controller 50 supplies again the motor drivers 52 and 53 with the pulse train signals Pa and Pb respectively. Simultaneously with this, the controller 50 compares the enumerated data Dx, obtained from the counter 56 which is counting the pulses forming the pulse train signal Pa, with the target data DX, stored in the register Gx. Controller 50 ceases to supply the pulse train signal Pa when the enumerated data Dx coincide with the target data DX. Controller 50 also compares the enumerated data Dy, obtained from the counter 57 which is counting the pulses forming the pulse train signal Pb, with the target data DY, stored in the register Gy. Controller 50 ceases to supply the pulse train signal Pb when the enumerated data Dy coincides with the target data DY. With such operations of the controller 50, the motor 14 is rotated in accordance with the pulses forming the pulse train signal Pa of a number selected in response to the position designating data Da. The motor 24 is rotated in accordance with the pulses forming the pulse train signal Pb of a number selected in response to the position designating data Da, so that the card holding member 17 is moved into a position corresponding to the position designating data Da from the card loading and unloading position. When the card holding member 17 is kept at the position corresponding to the position designating data Da, the optical card 18 on the card holding member 17 is positioned so that the laser light beam, emanating through the objective lens 39 from the optical recording device, is incident upon a position on the optical card 18 at which the first record track, in one of the sectors 18S in the line and row designated by the position designating data Da, is to be formed.

Under such a condition, the controller 50 supplies the mirror driver 59 with the driving signal Sm. The mirror driver 59 causes the actuator 37 to operate in response to the driving signal Sm for rotating the rotary mirror 38 clockwise and counterclockwise. The detection output signal Sn corresponding to the clockwise and counterclockwise rotations of the rotary mirror 38 is supplied from the mirror driver 59 to the controller 50. Periods of time of the clockwise and counterclockwise rotations of the rotary mirror 38 are separately detected by the controller 50. During the period of time of the clockwise rotation of the rotary mirror 38, the controller 50 supplies the laser driver 60 with the driving signal Sl and the data memory 61 with the data control signal Cd. Accordingly, the data Di for writing, selected from the data memory 61 in response to the data control signal Cd, is delivered to the laser driver 60 only during the period of time of the clockwise rotation of the rotary mirror 38. The laser driver 60 operates in accordance with the driving signal Sl to cause the laser light source 35 to emit the laser light beam, modulated in accordance with the data Di for writing. This laser light beam from the laser light source 35 impinges upon the optical card 18 through the collimator lens 36, the rotary mirror 38 and the objective lens 39. It scans the optical card 18 in the X direction in synchronism with the clockwise rotation of the rotary mirror 38. Consequently, each of the record tracks is formed to extend linearly in the X direction on the optical card 18 by the laser light beam, incident upon the same, only during the period of time of the clockwise rotation of the rotary mirror 38.

The controller 50 supplies the motor driver 53 with the pulse train signal Pb during the period of time of the counterclockwise rotation of the rotary mirror 38. Therefore the motor 24 is rotated to move the card holding member 17 by a predetermined distance in the Y direction during the period of time of the counterclockwise rotation of the rotary mirror 38.

Figure 5:
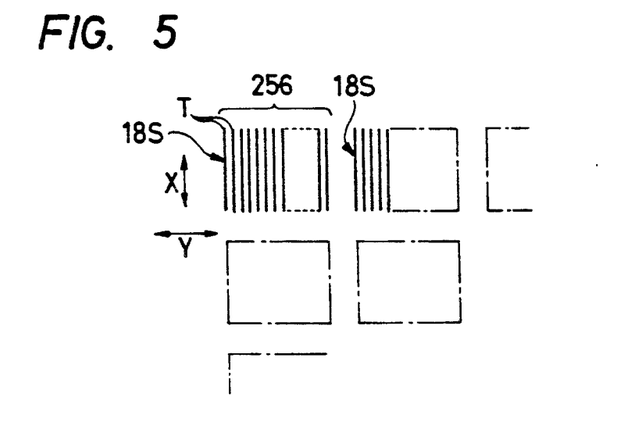
FIG. 5 is an illustration used for explaining the operation of the embodiment shown in FIG. 1.
Figure 6:
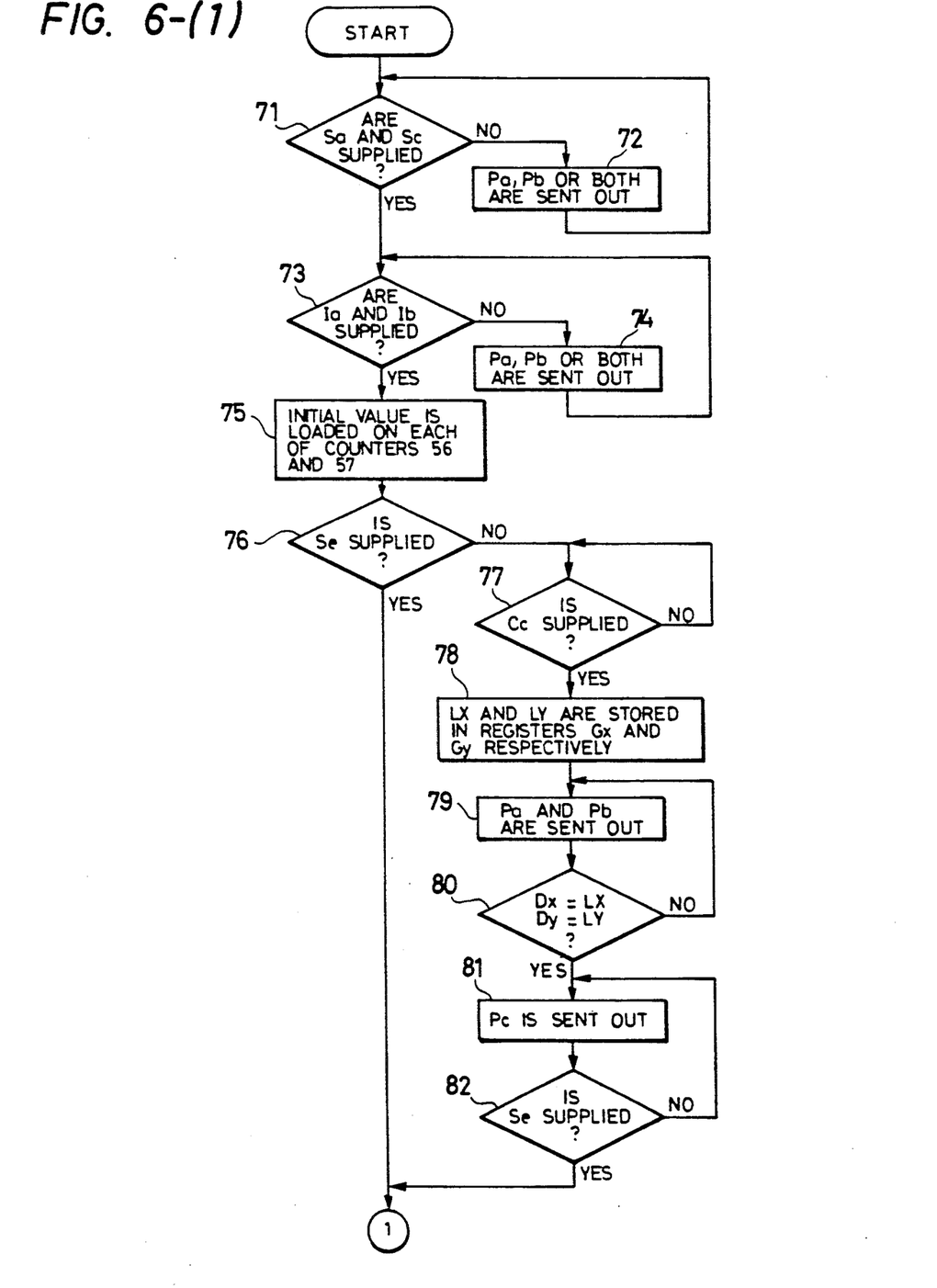

As a result of the operations described above, as shown in FIG. 5, a number of record tracks T, each extending in the X direction, are formed successively at predetermined intervals in the Y direction at a position of one of the sectors 18S on the optical card 18 and the data Di for writing are written in the optical card 18. In such writing of the data Di, the pulse Pt which is obtained whenever each record track T is formed on the optical card 18, is supplied from the controller 50 to the track counter 62 and the number of the pulses Pt, namely, the number of the record tracks T is counted by the track counter 62. When the enumerated resultant of the track counter 62 reaches a predetermined value, for example, 256, in other words, when 256 record tracks T are formed on the optical card 18, the count detection signal St is supplied to the controller 50. In response to the count detection signal St, the controller 50 ceases to supply both the driving signals Sm and Sl and the data control signal Cd, so that the writing of information in one of the sectors 18S is completed. As a result, one of the sectors 18S including 256 recording tracks T each extending in the X direction at predetermined intervals, as shown in FIG. 5, is formed at the position on the optical disc 18 designated by the position setting data Da.

In the case where other data are written in the optical card 18 successively, the controller 50 is supplied again with the writing command signal Cw from the command signal and data generator 51. Controller 50 repeats the above described controls, and another sector 18S is formed at a position on the optical card 18 newly designated by the position designating data Da from the command signal and data generator 51. Each sector 18S is distant, by a distance longer than a space between two adjacent record tracks, from an adjacent sector in each of the X and Y directions.

The controller 50 includes, for example, a microprocessor. One example of an operation program of such a microprocessor for controlling the writing of information is carried out in accordance with a flow chart shown in a divided manner in FIGS. 6-(1) and 6-(2).

According to the flow chart shown in FIGS. 6-(1) and 6-(2), first, in decision 71, it is checked whether the detection output signals Sa and Sc are supplied from the limit switch 26 and 28 respectively. When at least one of the detection output signals Sa and Sc is not supplied, the pulse train signal Pa or Pb is supplied to the motor driver 52 or 53, or the pulse train signals Pa and Pb are supplied to the motor drivers 52 and 53, respectively, in process 72, and the step returns to the decision 71.

When it is clarified in the decision 71 that the detection output signals Sa and Sc are supplied, it is checked whether the detection output signals Ia and Ib are supplied from the photodetecting switches 31 and 33 respectively, in decision 73. When at least one of the detection output signals Ia and Ib is not supplied, the pulse train signal Pa or Pb is supplied to the motor driver 52 or 53, or the pulse train signals Pa and Pb are supplied to the motor drivers 52 and 53, respectively, in process 74, and the step returns to the decision 73.

When it is clarified in the decision 73 that the detection output signals Ia and Ib are supplied, that is, when the card holding member 17 is placed at the reference position in both the X and Y directions, the initial value data obtained respectively from the initial value data generators 54 and, 55 are loaded on the counters 56 and 57, in process 75. Then it is checked whether the detection output signal Se is supplied from the limit switch 34, in decision 76. When the detection output signal Se is not supplied, that is, when the optical card 18 is not loaded on the card holding member 17, it is checked whether the card loading and unloading command signal Cc is supplied from the command signal and data generator 51, in decision 77. If the card loading and unloading command signal Cc is not supplied, the check in the decision 77 is repeated. If the card loading and unloading command signal Cc is supplied, predetermined data LX and LY are stored in the registers Gx and Gy, respectively, in process 78. Then, the pulse train signals Pa and Pb are supplied to the motor drivers 52 and 53 respectively in process 79. Next, in decision 80, is checked whether the enumerated data Dx obtained from the counter 56 is coincident with the data LX, and whether the enumerated data Dy obtained from the counter 57 is coincident with the data LY. When it is clarified that the enumerated data Dx and Dy are not coincident with the data LX and LY respectively, the step returns to the process 79 and the check in the decision 80 is repeated.

To the contrary, if it is clarified in the decision 80 that the enumerated data Dx and Dy are coincident with the data LX and LY respectively, that is, when the card holding member 17 has reached the card loading and unloading position, the driving signal Pc is sent out to the motor driver 58 in process 81, so that the optical card 18, caused to engage the card supporting portion 17A, is moved toward the limit switch 34. Then, it is checked whether the detection output signal Se is supplied from the limit switch 34, in decision 82. When the detection output signal Se is not supplied, the step returns to the process 81 and the check in the decision 82 is repeated. When the detection output signal Se is supplied, that is, when the optical card 18 has been properly positioned on the card supporting portion 17A, the step advances to decision 83.

On the other hand, if it is clarified in the decision 76 that the detection output signal Se is supplied, the step advances directly to the decision 83. In decision 83, it is checked whether the writing command signal Cw is supplied from the command signal and data generator 51. When the writing command signal Cw is not supplied, the check in the decision 83 is repeated. When the writing command signal Cw is supplied, the target data DX, corresponding to the position on the optical card 18 in the X direction designated by the position designating data Da, and the target data DY, corresponding to the position on the optical card 18 in the Y direction designated also by the position designating data Da, are stored in the registers Gx and Gy, respectively, in process 84. Then, in decision 85, it is checked whether the enumerated data Dx obtained from the counter 56 is coincident with the target data DX. Further it is also checked whether the enumerated data Dy obtained from the counter 57 is coincident with the data DY. When it is clarified that the enumerated data Dx and Dy are not coincident with the target data DX and DY respectively, the pulse train signals Pa and Pb are supplied to the motor drivers 52 and 53 respectively, in process 86, and the step returns to the decision 85.

To the contrary, if it is clarified in the decision 85 that the enumerated data Dx and Dy are coincident with the target data DX and DY respectively, the driving signal Sm is sent out to the mirror driver 59 in process 87 so that the rotary mirror 38 is rotated clockwise and counter clockwise. After that, it is checked whether the rotary mirror 38 is in its clockwise rotation based on the detection output signal Sn obtained from the mirror driver 59, in decision 88. If it is clarified in the decision 88 that the rotary mirror 38 is in its clockwise rotation, the driving signal S and the data control signal Cd are supplied to the laser driver 60 and the data memory 61 respectively, in process 89, and the step advances to decision 91. To the contrary, if it is clarified in the decision 88 that the rotary mirror 38 is not in its clockwise rotation but in its counterclockwise rotation, the pulse train signal Pb is supplied to the motor driver 53, in process 90, so that the card holding member 17 is moved by a predetermined short distance in the Y direction, and the step advances to decision 91.

In the decision 91, it is checked whether the count detection signal St is supplied from the track counter 62. When the count detection signal St is not supplied, since one of the sectors 18S each including, for example, 256 record tracks, has not been formed completely on the optical card 18, the step returns to the decision 88 and each of the decisions-and processes succeeding in series to the process 87 is repeated. On the other hand, when the count detection signal St is supplied, that is, when one of the sectors 18S, each including 256 record tracks is completed, it is checked whether he writing of data is continued, in decision 92. If the writing of data is continued, the step returns to the decision 83 and each of the decisions and processes succeeding in series to the decision 82 is repeated. If the writing of data is not continued, the program is terminated.

The optical card recording apparatus according to the present invention is especially useful for writing new information on various optical cards used as, for example, an identification card, a credit card, a cash card and the like. The invention is also useful for renewing information written on those optical cards.

We claim:

1. An optical card recording apparatus comprising:
   (a) a fixed member;
   (b) a card holding member connected to the fixed member and provided with a card supporting portion on which an optical card is loaded at a predetermined position, the card holding member being movable relative to the fixed member in first and second directions which are perpendicular to each other;
   (c) driving means for moving the card holding member in the first and second directions in relation to the fixed member;
   (d) reference position detecting means for detecting when the card holding member is positioned at a reference position in relation to the fixed member and generating a corresponding output signal;
   (e) optical means for writing on the optical card by emitting a light beam to impinge upon the optical card loaded at the predetermined position; and
   (f) movement control means operative to control the driving means to put the card holding member at the reference position and then, after generation of a detection output of the reference position detecting means, to control further the driving means to move the card holding member in the first and second directions in a predetermined manner from either the reference position or a position at which the card holding member is placed, after moving from the reference position by a selected distance in one of the first and second directions, so that record tracks are formed on the optical card in a predetermined arrangement by the light beam emitted from the optical means and caused to be incident upon the optical card loaded on the card holding member at the predetermined position.

2. An optical card recording apparatus according to claim 1, wherein the movement control means comprises:
   a control circuit for controlling the operation of the driving means and the optical means; and
   a command signal and data generating circuit for supplying the control circuit with output information including a writing command signal, position designated data and a card loading and unloading signal.

3. An optical card recording apparatus according to claim 2, wherein;
   the driving means includes a first motor for moving the card holding member in the first direction and a second motor for moving the card holding member in the second direction; and
   the control circuit includes a controller operative to send out first and second pulse train signals for driving the first and second motors respectively, a first counter for counting pulses forming the first pulse train signal, and a second counter for counting pulses forming the second pulse train signal.

4. An optical card recording apparatus according to claim 3, wherein the controller includes:
   a first register containing first target data corresponding to a position in the first direction designated by the position designating data from the command signal and data generating circuit; and
   a second register containing second target data corresponding to a position in the second direction designated by the position designating data from the command signal and data generating circuit; and wherein
   the controller is operative to compare enumerated data obtained from the first counter with the first target data stored in the first register, and to compare enumerated data obtained from the second counter with the second target data stored in the second register; and
   the controller is further operative to control the supply of each of the first and second pulse signals in response to each comparison result.

5. An optical card recording apparatus according to claim 3, wherein the control circuit includes a track counter for counting pulses each of which is obtained whenever a record track is formed on the optical card.

6. A device for recording information on an optical card, comprising:
   (a) a fixed member;
   (b) a card holding member mounted on the fixed member, the card holding member having a card supporting portion onto which the optical card is loaded in a fixed position, the card holding member being moveable in first and second orthogonal directions relative to the fixed member;
   (c) a reference position detecting means for detecting the card holding member at a reference position in relation to the fixed member and generating a corresponding detection output signal;
   (d) a driving means for moving the card holding member in the first and second orthogonal directions;
   (e) optical means, including a laser light source for emitting a light beam which is modulated in response to information to be written on the optical card and an objective lens, for directing a light beam onto the optical card so that information can be written on the optical card; and
   (f) a movement control means connected to the driving means, the optical means and the reference position detecting means for causing the driving means to move the card holding member to a reference position, and then, after receiving a detection output from the reference position detecting means, to cause the driving means to move the card holding member in the first and second orthogonal directions in a predetermined manner from either the reference position or a position at which the card holding member is placed after moving from the reference position by a selected distance in one of the first and second orthogonal directions, so that record tracks are formed on the optical card in a predetermined manner by the light beam emitted by the optical means.

7. The device according to claim 6, wherein the reference position detecting means includes:
   a first mirror attached in a fixed position in relation to the card holding member in the first direction;
   a first photodetecting switch attached in a fixed position in relation to the fixed member in the first direction, the first photodetecting switch being positioned to face the first mirror when the card holding member is in the reference position with respect to the first direction;
   a second mirror attached in a fixed position in relation to the card holding member in the second direction;
   a second photodetecting switch attached in a fixed position in relation to the fixed member in the second direction, the second photodetecting switch being positioned to face the second mirror when the card holding member is in the reference position with respect to the second direction.

8. The device according to claim 6 wherein the card holding member has a top surface, the card supporting portion being depressed below the top surface of the card holding member, the optical card having a thickness and at least three edges, the depression in the card supporting portion being approximately equal to the thickness of the optical card, the card supporting portion having three edges dimensioned and oriented to contact the three optical card edges, so that the optical card is securely framed at a predetermined location on the card holding member.

9. The device according to claim 8 wherein the driving means comprises:
- a driving roller on the top surface of the card holding member, spanning across the card supporting portion of the card holding member, so that the driving roller contacts the optical card in the card supporting position;
- a first actuator attached to the driving roller for driving the driving roller to load and unload the optical card;
- an idle roller parallel to the driving roller, on the top surface of the card holding member, spanning across the card supporting portion of the card holding member, for holding the optical card in the card supporting portion of the card holding member.

10. The device according to claim 6 wherein the optical means for directing a light beam onto the optical card includes:
- a collimator lens positioned to receive the light beam;
- a actuator;
- a rotary mirror positioned above the optical card, the rotary mirror being driven by the actuator in a card scanning motion, the collimator lens being positioned between the laser light source and the rotary mirror;
- wherein the objective lens is located between the rotary mirror and the optical card, so that light emitted from the laser is first collimated by the collimator then directed onto the rotary mirror, then reflected through the objective lens allowing information to be written on the optical card at specific locations.

11. The device according to claim 6 further including card reading means comprising:
- a light emitting diode positioned above the card holding member;
- a converging lens positioned between the light emitting diode and the card holding member, the light emitting diode being positioned to direct light through the converging lens toward the optical card;
- a focusing lens positioned above the card holding member to receive light from the light emitting diode which is reflected off the optical card;
- a reading mirror positioned above the card holding member, the focusing lens being positioned between the card holding member and the reading mirror;
- a line photosensor positioned to receive light originating from the light emitting diode, directed through the converging lens, reflected off the optical card, directed through the focusing lens, and reflected off the reading mirror onto the line photosensor, so that the information written by the optical means is read by the line photosensor.

12. The device according to claim 6 further comprising:
- a first limit switch connected to the movement control means, the fixed member defining first, second, third and fourth boundaries framing the card holding member, beyond which the card holding member can not move, the first limit switch being located adjacent the first boundary to indicate to the movement control means when the card holding member is at the first boundary;
- a second limit switch connected to the movement control means, the second limit switch being located adjacent the second boundary to indicate to the movement control means when the card holding member is at the first boundary;
- a third limit switch connected to the movement control means, the third limit switch being located adjacent the third boundary to indicate to the movement control means when the card holding member is at the third boundary;
- a fourth limit switch connected to the movement control means, the fourth limit switch being located adjacent the fourth boundary to indicate to the movement control means when the card holding member is at the fourth boundary.

* * * * *